Patented Oct. 25, 1938

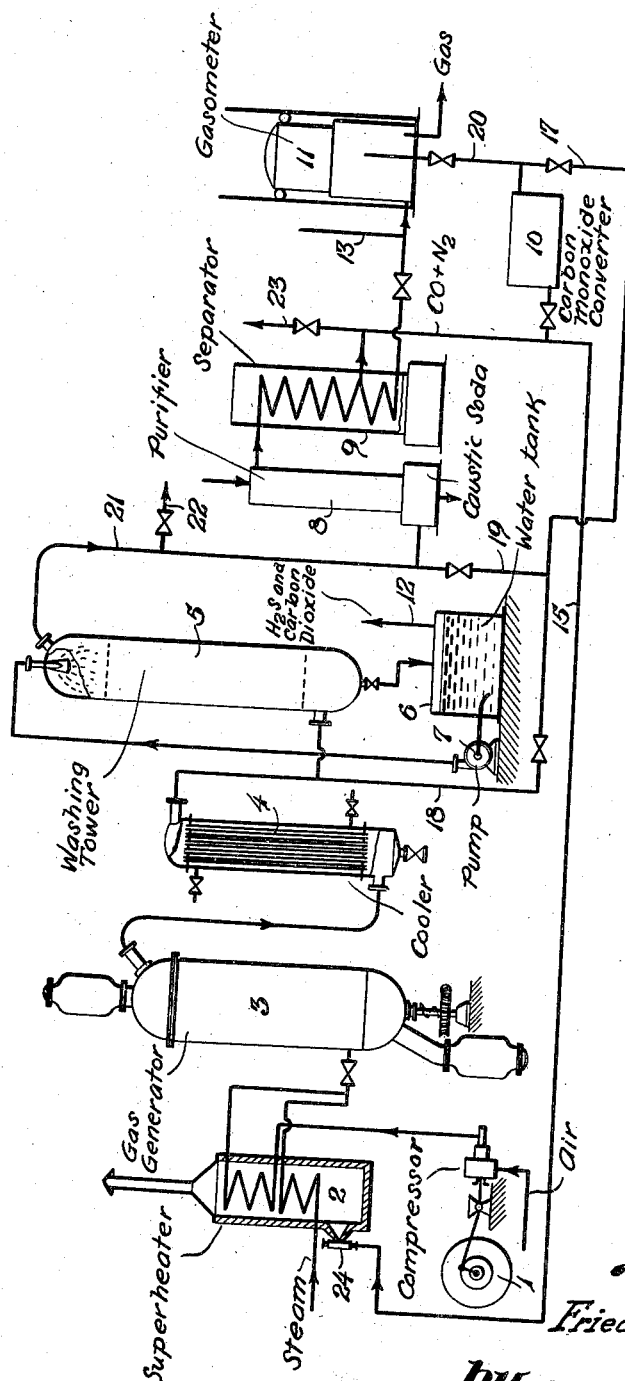

2,134,548

UNITED STATES PATENT OFFICE 2,134,548

PROCESS FOR THE PRODUCTION OF A GAS OF HIGH CALORIFIC POWER

Friedrich Danulat, Frankfort-on-the-Main, Germany, assignor to American Lurgi Corporation, New York, N. Y., a corporation of New York Application January 2, 1935, Serial No. 95
In Germany January 8, 1934

1 Claim. (Cl. 48—202)

This invention relates to a process for the production of a gas of high calorific power.

It is known to produce a gas of high calorific power by the gasification of fuels or degasification residues with oxygen and steam. In such case the gasification is carried out under a pressure of several atmospheres by means of oxygen or air enriched with oxygen, sufficiently large quantities of steam being provided in proportion to the oxygen as to ensure that the carbon of the fuel will be converted to a preponderant extent into carbon dioxide and hydrocarbons. By this process a gas can be produced which, after the carbon dioxide has been removed, is fully comparable with normal town gas in composition, calorific value, and burning properties. The employment of pressure enables the synthesis of hydrocarbons (chiefly methane) of high calorific power to proceed during the gasification process itself, so that, after being freed from the larger quantities of carbon dioxide formed during the gasification process, the gas has a calorific value of, for example, 4,500 cals. per cubic metre and over (measured at 0° C. and 760 mm. mercury gauge). The carbon monoxide content of this gas is about the same as that of ordinary town gas, and can be removed from the gas by the same processes that have been proposed for rendering town gas non-poisonous, for example, by the catalytic treatment of the carbon monoxide with steam, resulting in the formation of hydrogen or methane, or by condensing the carbon monoxide in a super-cooling plant for example.

If a non-poisonous gas (that is, one that is completely free from carbon monoxide, or nearly so) is to be produced from a gas formed by blowing bituminous fuels or degasification residues with oxygen and steam, it will be necessary to provide a plant for improving the gas, in addition to the producer plant and the apparatus required for the production of the oxygen (or air enriched with oxygen) that is necessary for operating the gas producer. For this reason the cost of the entire plant will be relatively heavy, thereby correspondingly lessening the economy of the production of a non-poisonous gas by said process.

It has now been ascertained in accordance with the present invention that, in many instances, the production of a gas of high calorific power by gasifying fuels under a pressure of several atmospheres can be carried on more economically by effecting the gasification under pressure with air, provided the process be performed in such a manner—by providing the gasifying medium with a sufficient content of steam, by suitably adjusting the pressure, and if necessary, preheating the gasifying medium—that considerable quantities of methane and other hydrocarbon compounds are obtained from bituminous and also non-bituminous fuels. The methane content imparts a high calorific value to the gas, so that after the removal of carbon dioxide, steam and like substances that are eliminable by condensation and by washing with water under pressure, the gas is to be regarded as approximately equal in value to water gas. If this gas, or a portion of same, be rendered non-poisonous by removing the carbon monoxide—for example by super-cooling—then, in accordance with the present invention, the nitrogen, or a portion thereof, is eliminated, with the carbon monoxide, in the process of rendering the gas non-poisonous, and there is then obtained an innocuous gas which is at least equal to town gas in calorific value and other properties. At the same time, the poison-eliminating plant is not substantially larger and more expensive to run than that required for rendering town gas, or similar practically nitrogen-free gases, non-poisonous.

In itself, the gasification of solid fuels with air under high pressure, such as over 3 atmospheres and more, is known. This gasification, however, was performed at such high gasification temperatures that the decomposition of the condensable constituents (tars and oils) into permanent gases ensued. The object of that process was to generate in this manner, a gas that was free from tar. Under such conditions, however, there is no synthetic formation of methane, without which the gas cannot be raised to the necessary heating value.

In carrying out the process of the present invention, for example, air is compressed to about 20-30 atmospheres, by a reciprocating compressor or the like, and is passed in admixture with a definite amount of highly superheated steam (for example under the same pressure) as gasifying medium, into a gas producer run at the same pressure, in which the charge of fuel (such as coke or coal) is converted into a crude gas high in methane. After cooling the gas, and condensing any tars and oils that may be present therein, the gas is passed, under the same pressure, through a washer, in which the carbon dioxide and sulphuretted hydrogen are removed by a simple washing with water, under pressure, by known methods. After chemical purification, for example with caustic soda—which serves to remove the final traces of carbon dioxide and the like from the gas—the carbon monoxide and the whole or a portion of the nitrogen are eliminated by super-cooling by known methods. This procedure furnishes, on the one hand, a gas which contains the methane and the heavy gaseous hydrocarbons, together with the hydrogen of the crude gas, in addition to small quantities of carbon monoxide (as a rule not exceeding 0.5%) and a larger or smaller amount of nitrogen and thus represents a high-grade, non-poisonous gas of high calorific power. There is also obtained on the other hand, a residual gas, which contains the carbon monoxide and the bulk of the nitrogen and is therefore a combustible gas, though of low quality, and can be utilized for any other convenient purposes. By working in accordance with the present invention, practically the whole of the carbon monoxide is removed from the gas, together with so much of the nitrogen that the desired calorific value and corresponding composition of the gas is attained. At the same time, in order to control the burning properties—increase its specific gravity for example—a portion of the previously separated carbon dioxide can be reunited with the gas.

As already mentioned, the formation of methane is effected by the application according to the invention, of elevated pressure and copious addition of steam during the gasification. The reaction of formation of methane is exothermic and, accordingly, the amount of oxygen required for maintaining the gasifying process is small, so that the crude gas is relatively low in nitrogen. The higher the gasification pressure the lower the nitrogen content of the gas, and for this reason, a pressure of, for example, 70–200 atmospheres may still be of particular advantage in certain cases. The increasing of the superheating temperature of the gasifying medium, prior to admission into the bed of fuel, has a similar effect on lowering the nitrogen content of the gas as the raising of the gasification pressure. The further known advantages attendant on the pressure gasification process per se, such as increased throughput, utilization of the pressure for the subsequent working stages, and so forth, are retained, since the influence of the inert nitrogen, for example on the throughput capacity, can be counteracted by a corresponding increase in pressure.

The carbon monoxide fraction removed in the process of rendering the gas non-poisonous can be employed, for example, for superheating the gasifying medium. In special cases, it may be suitable to precede the separation of the gases by supercooling by a partial catalytic treatment of the carbon monoxide—by means of steam if desired—to form methane or hydrogen, in order to reduce the loss of gas in the form of carbon monoxide, the remainder of the latter being then removed (if necessary) by supercooling.

The removal of carbon monoxide and nitrogen can also be effected from a portion of the gas, which is then re-mixed with the remainder that has not been improved, or has been improved by other means. Alternatively, the carbon monoxide removed by supercooling or otherwise can also be treated, separately, for conversion into methane or hydrogen by catalytic treatment and re-united to the main portion of the gas, either before or after the latter has been subjected to the separation treatment.

The following is a typical and highly advantageous method of carrying out the process of the present invention in practice.

In gas-producer plants, situated in coal districts gasification with air and steam, under a pressure of several atmospheres, according to the invention, furnishes a gas which, after being freed from carbon dioxide, has a calorific value of about 3,000 cals. per cubic metre and contains about 8–12% of methane. This gas can be used, with advantage, as an industrial and heating gas, or also as an addition to any gases produced by the distillation of coal, lignite and the like. This gas can be transmitted, under its initial pressure, through distance-supply mains, to the points of consumption, where a portion is utilized as industrial and heating gas. At the same or other points of consumption, central improving stations may be arranged, which distribute the gas for household purposes, after it has been freed from carbon monoxide and a portion of its nitrogen. The separated carbon monoxide can be sent back into the industrial-gas mains.

For the purpose of giving those skilled in the art a better understanding of the invention, a preferred procedure of carrying the process into practice will be described in conjunction with the accompanying drawing, which illustrates a system of apparatus in which the present process may be conducted.

A multistage compressor 1 compresses air to a pressure of about 20 to 30 atmospheres. The compressed air is conducted to a superheater 2 and is heated to a temperature of about 500° C. Steam, preferably superheated in the lower part of heater 2 and having approximately the same temperature and pressure as the compressed and pre-heated air, is admixed to the air. The mixture of air and steam is introduced as a gasification agent into the lower part of a gas generator 3 being under the same elevated pressure at which the solid fuel is gasified and produces a gas rich in methane. Conventional gas generators may be used which are preferably provided with sluice chambers for introducing fresh fuel and for the removal of ash. The gas produced leaves at the top of the generator 3 and is introduced into a tubular cooler 4. In the cooler the gas is cooled down to about 20 to 30° C. by means of water whereby tar and oils present in the gas are condensed and separated. From the cooler 4 the cooled gas is conducted to a washing tower 5 provided with water circulation under pressure in which the carbon dioxide and the greater part of the hydrogen sulfide are absorbed. The water is injected into the washing tower at the top thereof and trickles down for example over earthenware rings countercurrent to the gas which is introduced at the bottom of the tower and streams upward. After the water has absorbed the carbon dioxide and the hydrogen sulfide from the gas it is conducted into a tank 6 and is relieved from pressure whereby it will release the substances absorbed in the washing tower 5, particularly carbon dioxide and hydrogen sulfide. The water is again brought to the initial pressure by means of centrifugal pump 7 and is re-circulated through the tower 5 and tank 6. The gases separated from the circulating water leave the tank 6 through conduits 12 and may be subjected to treatments by a conventional apparatus for separating the carbon dioxide from the hydrogen sulfide which may be utilized in any desired manner. A portion of the carbon dioxide may be admixed through conduit 13 to the gas of high calorific power leaving the apparatus 9 in order to regulate its combustion properties.

After leaving the washing tower 5, the gas freed from carbon dioxide and hydrogen sulfide is introduced to the purifier 8 in which the last traces of carbon dioxide are eliminated by means of caustic soda. In the adjoining separator 9, the carbon monoxide and a portion of the nitrogen are eliminated from the gas so that a non-poisonous gas is produced which is practically free from carbon monoxide which has a high calorific power and which has the quality of town gas. The separated gas constituted principally of carbon monoxide and nitrogen may be used, for example, for heating the superheater 2 by burner 24, but it may also be converted into hydrogen and methane by one of the conventional catalytic processes and reintroduced into the gas circulation. This reintroduction may be before the washing tower 5 or the purifier 8, but in case the gas is practically free from carbon monoxide it can be directly introduced into the gasometer 11 and added to the gas free from carbon monoxide supplied by the separator 9. Conduits 14, 15, 16, 17, 18, 19 and 20 are provided in order to regulate the flow of the carbon monoxide and nitrogen which may be adjusted at will by means of valves associated with said conduits. From gasometer 11 the non-poisonous and purified town gas is introduced into the mains and distributed to the consumers.

The purifier 8, separator 9, the apparatus 10 for the conversion of the separated carbon monoxide into hydrogen and methane and the gasometer 11 may be provided at the same place where the gas generator 3 and its auxiliary apparatus compressor 1, superheater 2, cooler 4 and washing tower 5 are located. It is also possible, however, to separate the two groups of apparatus from each other and to connect them by means of long-distance mains. In case only a portion of the generated gas is subjected to the separation treatment and the rest is utilized without eliminating the poisonous constituents or is added to the portion freed from poisonous gases, conduits 22 are branched off from the main flow of gas in the apparatus preferably in the conduit 21 connecting the washing tower to purifier 8, or in a suitable part of the long-distance gas mains. Through conduit 23 the gas eliminated in the separator 9 and principally constituted of carbon monoxide and nitrogen may be added to the portion of the generated gas which is utilized in an untreated condition. As those skilled in the art will readily understand, elements 2 to 9 of the apparatus and if necessary element 10, are under the same elevated pressure.

The process of the present invention exhibits a series of noteworthy advantages.

According to the invention a perfectly pure, non-poisonous gas of high calorific value can be produced direct by the complete gasification of fuels and a single separation treatment.

The oxygen plant necessary in gasification with the aid of oxygen is dispensed with.

By means of a practically negligible enlargement of the gas separating plant, the nitrogen entering the gas with the gasifying air is removed at the same time as the carbon monoxide, whereas, in the known gasification of fuels with oxygen and steam under pressure, two gas-separating plants of approximately equal dimensions were required—one for the gas and the other for the air.

Simultaneously with the separating treatment, water, naphthalene and organic sulphur compounds are completely removed without additional expense.

Moreover, in the process of the present invention, the actual gasifying operation proceeds in a more advantageous manner, and freer from trouble, than in the known processes in which oxygen and steam are employed as gasifying media and the gasification is performed under a pressure of several atmospheres, (which known process will hereinafter be referred to by the abbreviated term "oxygen gasification"), because the air compressor is substantially more reliable in operation than the oxygen compressor, and, owing to the cooling action of the inert nitrogen, the risk of clinkering in the gas producer—a highly important factor in oxygen gasification—is substantially less imminent than is possible in oxygen gasification, through the increase in the already very high steam-saturation of the gasifying medium.

The present invention completely abolishes the risk of any sudden burning of pressure-supporting structural materials (such as iron, and the like) situated in the gas producer, such as may occur, in oxygen gasification—unless reliably prevented by special constructional measures—in the event of a sudden cessation of the supply of the steam added to the oxygen employed as the gasifying medium.

Finally, in the process of the present invention, less importance attaches to the losses of gasifying medium or crude gas—such as are liable to happen in any process of pressure gasification and, to some extent, even in charging and discharging fuel and ash into and from the producer—than in the case of oxygen gasification, in which the gasifying medium and also the crude gas are more expensive to produce. Consequently, the process of the present invention constitutes an important improvement over the known processes for the production of a non-poisonous town gas.

If, for example, pre-dried mid-German brown-coal is gasified at a producer load of about 800 kgs. per sq. metre of cross section per hour and under a pressure of about 25 atmospheres, with a gasifying medium consisting of air and steam (1 part by volume of air to 1.6 parts by volume of steam) heated to about 500° C. a crude gas of approximately the following composition is obtained:—

| | Per cent |
|---|---|
| $CO_2$ | 22.8 |
| $H_2S$ | 1.4 |
| $C_nH_m$ | 0.7 |
| $O_2$ | 0.1 |
| $H_2$ | 23.1 |
| $CO$ | 11.7 |
| $CH_4$ | 11.3 |
| $N_2$ | 28.9 |

This gas is almost completely freed from carbon dioxide and sulphuretted hydrogen by water in a pressure washer, and then has the composition:—

| | Per cent |
|---|---|
| $C_nH_m$ | 0.9 |
| $O_2$ | 0.1 |
| $CO$ | 15.4 |
| $H_2$ | 30.5 |
| $CH_4$ | 14.9 |
| $N_2$ | 38.2 |

The calorific value is about 3,000 cal. per cubic metre.

On passing this gas through a separation plant thereby removing the carbon monoxide and the nitrogen, to a certain extent, a non-poisonous town gas, having the following composition is obtained:—

| | Per cent |
|---|---|
| $C_nH_m$ | 1.6 |
| $O_2$ | 0.2 |
| CO | 0.5 |
| $H_2$ | 54.3 |
| $CH_4$ | 26.6 |
| $N_2$ | 16.8 |

The maximum calorific value of this gas is about 4,450 cal. per cubic metre.

I claim:—

The process of producing a non-poisonous gas of high calorific power which comprises gasifying a solid carbonaceous fuel under a pressure in excess of twenty atmospheres with a gasifying agent consisting of air and steam in such proportions that about 1 part by volume of air is present for about 1.6 parts by volume of steam whereby substantial quantities of methane are produced, and subsequently supercooling the resulting crude gas to eliminate the carbon monoxide and at least part of the nitrogen therefrom.

FRIEDRICH DANULAT.